US012759730B2

(12) United States Patent
Chan et al.

(10) Patent No.: US 12,759,730 B2
(45) Date of Patent: Oct. 13, 2026

(54) COORDINATED END EFFECTOR ATTACHMENT OF FASTENERS TO AIRCRAFT STRUCTURE

(71) Applicant: The Boeing Company, Chicago, IL (US)

(72) Inventors: Kwok Tung Chan, Seattle, WA (US); Farahnaz Sisco, Mukilteo, WA (US); Daniel R. Smith, Woodinville, WA (US); Darrell D. Jones, Mill Creek, WA (US); Eric M. Reid, Kenmore, WA (US); Riley HansonSmith, Bothell, WA (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 17/454,253

(22) Filed: Nov. 10, 2021

(65) Prior Publication Data

US 2022/0153432 A1 May 19, 2022

Related U.S. Application Data

(60) Provisional application No. 63/115,030, filed on Nov. 18, 2020.

(51) Int. Cl.
*B64F 5/10* (2017.01)

(52) U.S. Cl.
CPC .................................... *B64F 5/10* (2017.01)

(58) Field of Classification Search
CPC ........................................................ B64F 5/10
See application file for complete search history.

(56) References Cited

U.S. PATENT DOCUMENTS

| | | | | |
|---|---|---|---|---|
| 4,967,947 A | 11/1990 | Sarh | | |
| 8,296,923 B2 * | 10/2012 | Wampler | B25J 19/0029 409/230 | |
| 2010/0122444 A1 | 5/2010 | Reid et al. | | |
| 2013/0019446 A1 | 1/2013 | Venskus et al. | | |

(Continued)

FOREIGN PATENT DOCUMENTS

| | | |
|---|---|---|
| CN | 101362302 B | 8/2010 |
| DE | 202008014886 U1 | 4/2010 |

(Continued)

OTHER PUBLICATIONS

Machine Translation of JP 2001-079637A by Oikawa Kiichiro and Fujita Genichi. Mar. 27, 2001 (Year: 2001).*

(Continued)

*Primary Examiner* — Nirvana Deonauth
(74) *Attorney, Agent, or Firm* — Yee & Associates, P.C.

(57) ABSTRACT

Systems and methods are provided for applying fasteners to a structure. One embodiment is a method that includes disposing a first set of end effectors along a fixed inner track that follows an Inner Mold Line (IML) of a structure, disposing a second set of end effectors along a fixed outer track that follows an Outer Mold Line (OML) of the structure, aligning a first end effector at the fixed inner track with a second end effector at the fixed outer track, clamping the structure between the first end effector and the second end effector, by pressing the first end effector and the second end effector into the structure, and applying a fastener to the structure.

21 Claims, 11 Drawing Sheets

(56) References Cited

U.S. PATENT DOCUMENTS

| | | | | |
|---|---|---|---|---|
| 2018/0056511 | A1* | 3/2018 | Ayyagari | B25J 5/005 |
| 2019/0030588 | A1* | 1/2019 | Hirai | B64F 5/10 |

FOREIGN PATENT DOCUMENTS

| | | | |
|---|---|---|---|
| EP | 0956915 | A2 | 11/1999 |
| EP | 3378789 | A1 | 9/2018 |
| JP | 2001079637 | A | 3/2001 |

OTHER PUBLICATIONS

Extended European Search Report (EESR) dated Apr. 21, 2022, regarding Application No. 21207361, 10 pages.

Netherlands Patent Office Written Opinion and Search Report with English Translation, dated Jul. 9, 2021, regarding Application No. NL2027388, 13 pages.

Netherlands Patent Office Written Opinion and Search Report with English Translation, dated Aug. 2, 2021, regarding Application No. NL2027391, 10 pages.

Extended European Search Report (EESR) dated Apr. 20, 2022, regarding Application No. EP 21207360, 7 pages.

European Patent Office Communication, dated Mar. 16, 2023, regarding Application No. EP21207361.3, 5 pages.

European Patent Office Communication, dated Mar. 17, 2023, regarding Application No. EP21207360.5, 3 pages.

European Patent Office Communication, dated Nov. 9, 2023, regarding Application No. EP21207360.5, 4 pages.

Japanese Office Action, dated Jul. 22, 2025, regarding JPO Application No. 2021-183210, 5 pages.

China National Intellectual Property Administration Office Action, dated Sep. 23, 2025, regarding CNIPA Application No. 202111352686.7, 18 pages.

* cited by examiner

COORDINATED END EFFECTOR ATTACHMENT OF FASTENERS TO AIRCRAFT STRUCTURE

CROSS-REFERENCE TO RELATED APPLICATION

This application claims the benefit of U.S. Provisional Patent Application Ser. No. 63/115,030, filed Nov. 18, 2020, and entitled "Coordinated End Effector Attachment of Fasteners to Aircraft Structure;" which is incorporated herein by reference in its entirety.

FIELD

The disclosure relates to the field of assembly, and in particular, to assembly of structures such as aircraft.

BACKGROUND

Structures, such as portions of the airframe of an aircraft, may be assembled via the application of fasteners such as lockbolts, pins secured by nuts, rivets, etc. However, fasteners may be particularly difficult to install onto structures that include contours, as alignment of the fasteners with the structure may be more complex. The installation of fasteners onto such structures is therefore either labor intensive, or it necessitates the use of complex robots.

Therefore, it would be desirable to have a method and system that take into account at least some of the issues discussed above, as well as other possible issues.

SUMMARY

Embodiments described herein provide for end effectors that are arranged on fixed tracks following an Inner Mold Line (IML) and an Outer Mold Line (OML) of a structure that will receive fasteners. The fixed tracks are not attached to the structure itself. Because the fixed tracks correspond with the contours of the structure, the end effectors are held in an enforced alignment with the structure when installing fasteners. This relationship remains true even as the end effectors are moved along the fixed tracks to install fasteners at different radial locations along the structure. The arrangement described above also allows the structure to be moved relative to the end effectors by any desired amount, such that fasteners may be installed at various positions along the length of the structure.

One embodiment is a method for applying fasteners to a structure. The method includes disposing a first set of end effectors along a fixed inner track that follows an Inner Mold Line (IML) surface of a structure, disposing a second set of end effectors along a fixed outer track that follows an Outer Mold Line (OML) surface of the structure, aligning a first end effector at the fixed inner track with a second end effector at the fixed outer track, clamping the structure between the first end effector and the second end effector, by pressing the first end effector and the second end effector into the structure, and applying a fastener to the structure.

A further embodiment is a non-transitory computer readable medium embodying programmed instructions which, when executed by a processor, are operable for performing a method for applying fasteners to a structure. The method includes disposing a first set of end effectors along a fixed inner track that follows an Inner Mold Line (IML) surface of a structure, disposing a second set of end effectors along a fixed outer track that follows an Outer Mold Line (OML) surface of the structure, aligning a first end effector at the fixed inner track with a second end effector at the fixed outer track, clamping the structure between the first end effector and the second end effector, by pressing the first end effector and the second end effector into the structure, and applying a fastener to the structure.

Another embodiment is a system for applying fasteners to a structure. The system includes a fixed inner track along an Inner Mold Line (IML) side, an IML end effector disposed along the fixed inner track to face an IML surface of the structure. The fixed inner track is shaped to enable the IML end effector to follow the IML surface of a structure. The system further includes a fixed outer track along an Outer Mold Line (OML) side, and an OML end effector disposed along the fixed outer track to face an OML surface of the structure. The fixed outer track is shaped to enable an end effector to follow the OML surface of the structure. The end effectors of the first set are configured to operate in tandem with the end effectors of the second set to clamp the structure and install the fasteners.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
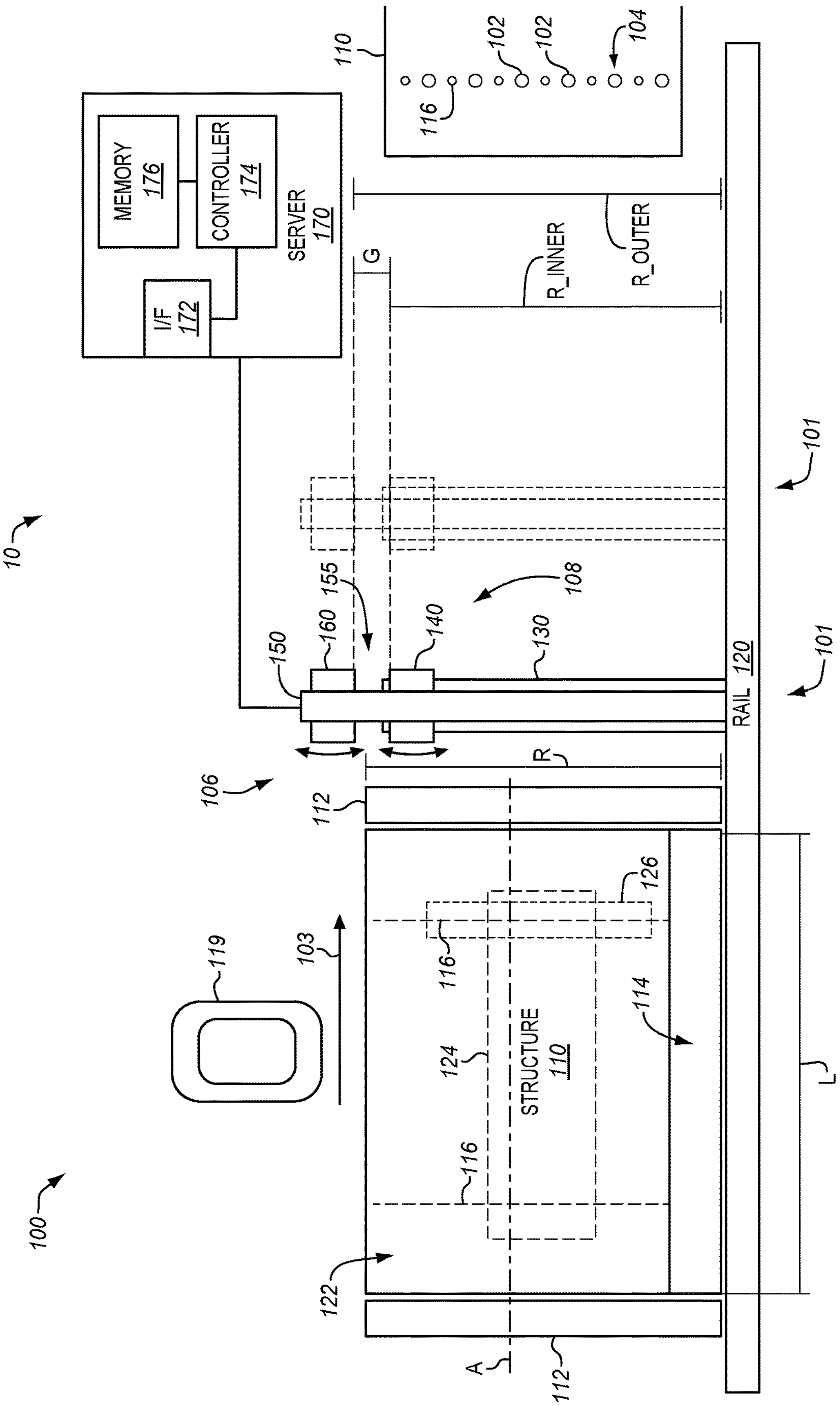
FIG. 1 is a schematic block diagram of a fastener installation system in an illustrative embodiment.

FIG. 1 is a schematic block diagram of a fastener installation system 100 in an illustrative embodiment. Fastener installation system 100 may have one or more work stations in a series of work stations along a pulsed manufacturing line 10 where a component and/or assembly of components is moved through the series of work stations via pulsed movements. The fastener installation system 100 may be a particular pulsed line system along the pulsed manufacturing line 10, which can include a series of fabrication and/or assembly systems through which the component and/or assembly passes to manufacture a final assembly. A particular example of the fastener installation system 100 is a fastener installation system 300 (shown in FIGS. 3-6). The fastener installation system 100 includes at least one installation station. The installation station 101 includes a fixed inner track 130, a fixed outer track 150, one or more IML end effectors associated with the fixed inner track 130, and one or more OML end effectors associated with the fixed outer track 150. When the fastener installation system 100 includes more than one installation station, a pair 155 of end effectors 140, 160 at a first installation station can operate simultaneously with another pair 155 of end effectors 140, 160 in a second installation station. For example, when a surround 119 is being secured to the structure 110, at least one pair of end effectors 140, 160 operates on a fore portion of the surround 119 to install fasteners 102, and at least one other pair of end effectors 140, 160 operates on an aft portion of the surround 119, wherein the pairs operate simultaneously on the fore portion and the aft portion.

Fastener installation system 100 (also known as a "fastener installation station" of the pulsed manufacturing line 10) comprises any system, device, or component operable to utilize a mobile Inner Mold Line (IML) end effector and a mobile Outer Mold Line (OML) end effector to perform installation of fasteners 102 at a structure 110. More specifically, the IML end effector is configured to perform fastener installation at an inner mold line surface, such as IML surface 316 (shown in FIG. 3), of the structure 110. Similarly, the OML end effector is configured to perform fastener installation at an outer mold line surface, such as OML surface 318 (shown in FIG. 3), of the structure 110. Examples of the IML end effector are end effectors 342, 344, 346 shown in FIGS. 3-6, and example of the OML end effector are end effectors 362, 364, 366 shown in FIGS. 3-6. The fastener 102 can be any suitable type of fastener, such as a lockbolt, nut, rivet, and/or an interference-fit fastener.

Fastener installation system 100 has been enhanced to provide end effectors 140, 160 at inner and outer fixed tracks that a structure 110 passes between. An example of the fixed inner track 130 is the fixed inner track 330 shown in FIGS. 3-6, and an example of the fixed outer track 150 is a fixed outer track 350 shown in FIGS. 3-6. The end effectors 140, 160 operate in a coordinated fashion to install fasteners 102 in holes 104 during pauses between pulsed movements of the structure 110 with respect to the fixed tracks. A pulsed movement comprises a motion of the structure 110 that proceeds for less than a length L of the structure 110. Each pulse may move a fastener installation location 116 from a prior work station to a next work station in the fastener installation system 100. During each pause, fasteners 102 are installed within an installation orbit of the IML end effectors and the OML end effectors, which are mounted on fixed tracks.

In this embodiment, a structure 110 comprises a half-barrel section of a fuselage (i.e., a fuselage portion 308 (shown in FIG. 3) of a fuselage having an open, semicircular cross-section) that is moved along a rail 120 or similar structure between fixed inner track 130 and fixed outer track 150. The structure 110 includes a curved section 122. The curved section 122 has the radius R; however, the radius of the curved section 122 need not be constant along the entirety of the IML surface 316 of the structure 110. The structure 110 also includes a longitudinal portion 124 that is a region of the structure extending generally along a longitudinal axis A of the structure 110. The longitudinal portion 124 receives fasteners 102 as described in more detail below.

The rail 120 is part of the pulsed manufacturing line 10 and helps the structure 110 to be transported for fabrication via pulsed-line assembly techniques. Between pulsed motions of structure 110 along the fixed tracks, the structure 110 may be indexed, and fasteners 102 may be installed by coordinated actions of an OML end effector that travels along fixed outer track 150, and an IML end effector that travels along the fixed inner track 130.

Figure 3:
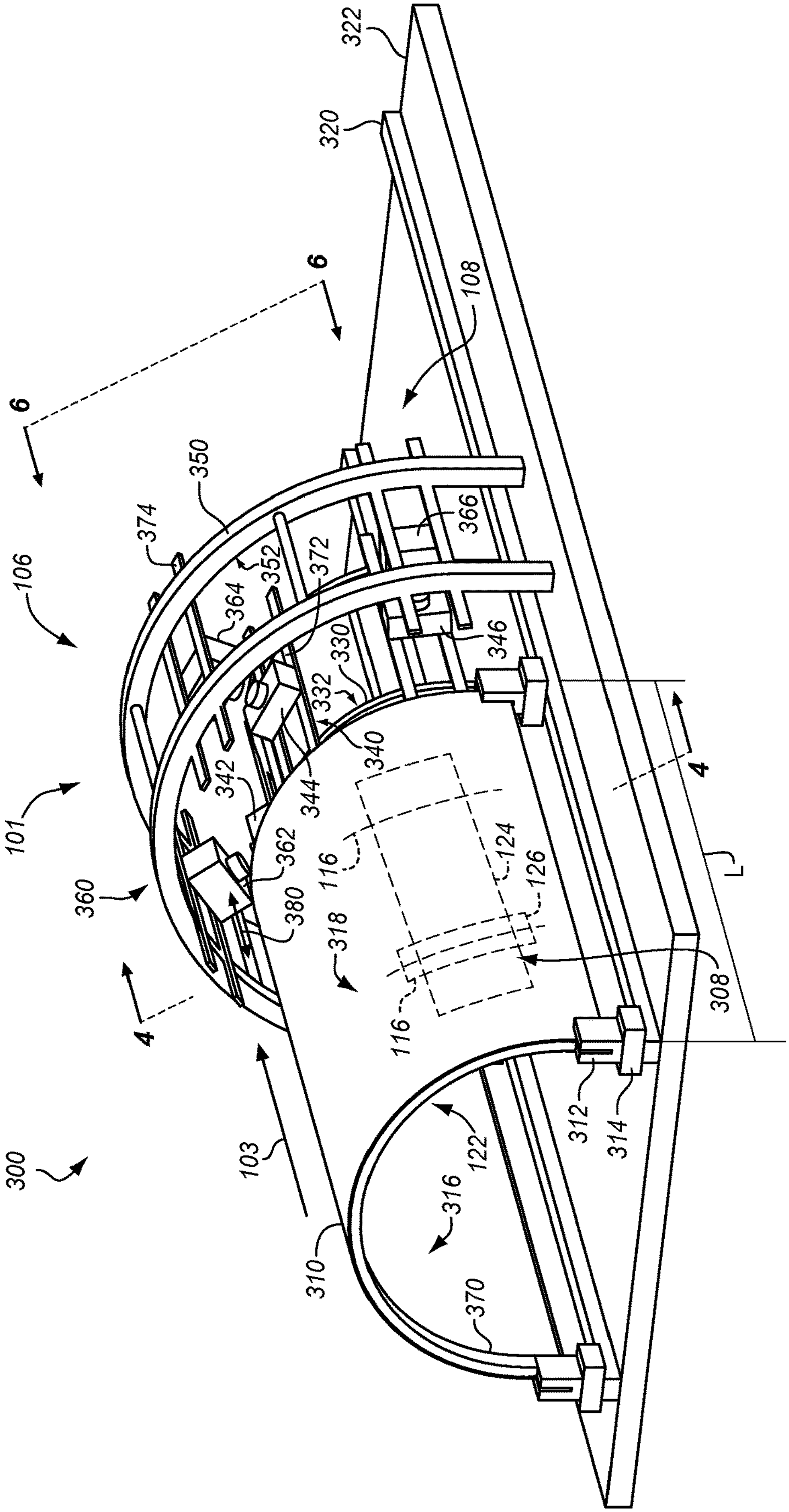
FIG. 3 is a perspective view of a fastener installation system that is a particular example of the schematic fastener installation system shown in FIG. 1.
Figure 4:
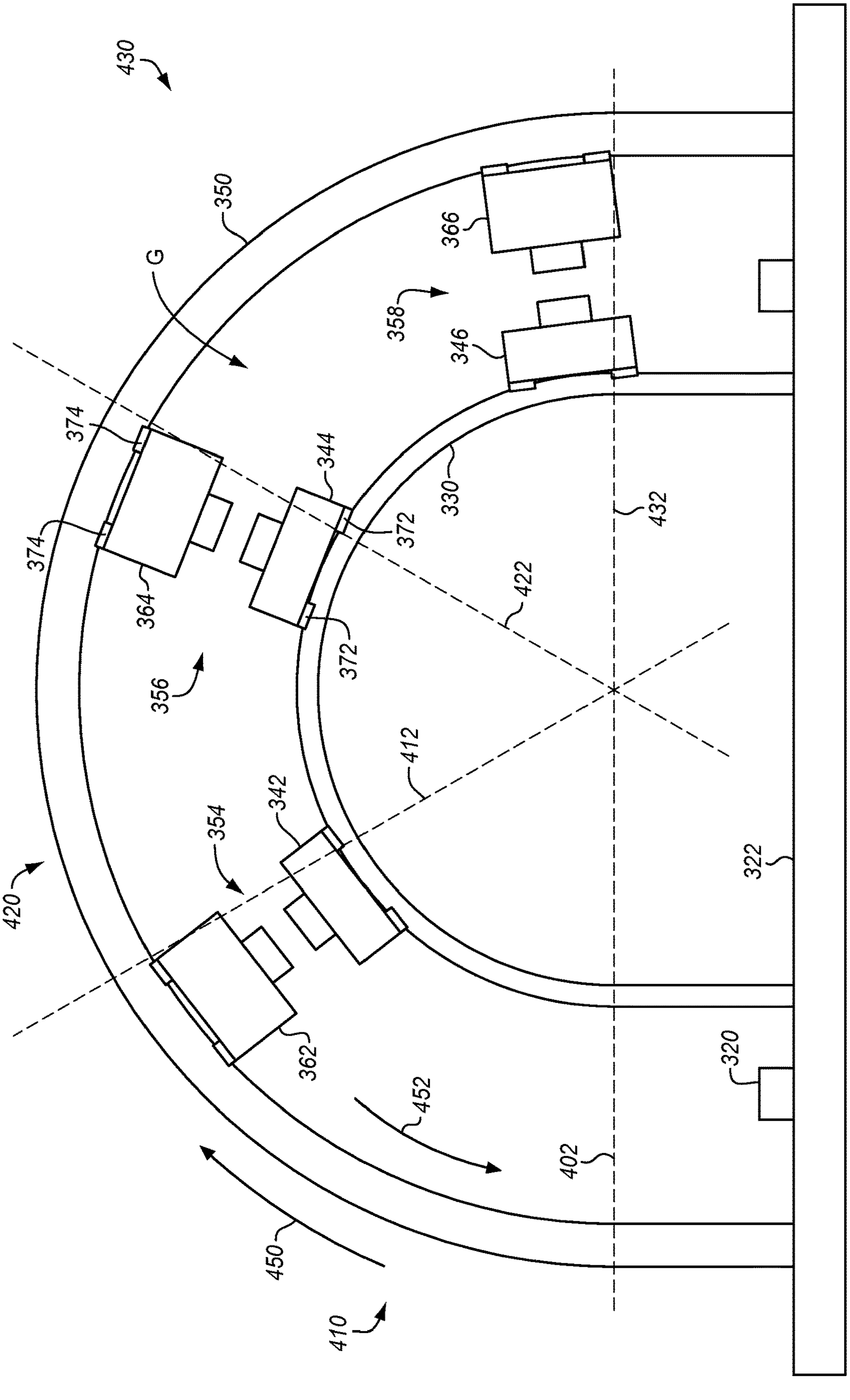
FIG. 4 is an end view of the fastener installation system of FIG. 3 prior to receiving a structure in an illustrative embodiment.

As shown in FIGS. 3-6, numerous ones of IML end effectors and OML end effectors may be disposed along different radial portions of their respective fixed tracks as first set 340 and second set 360 of end effectors. Each OML end effector coordinates and works in a paired relationship with a corresponding one of IML end effectors. The controller 174 operates at least one pair of an IML end effector and an OML end effector. Any number of paired end effectors can be utilized to perform this work, and each pair 155 of end effectors 140, 160 may perform work within a pre-partitioned portion of a half-circle. Example of paired end effectors are shown in FIG. 4 as pairs 354, 356, 358 each having an IML end effector and an OML end effector. The size of the pre-partitioned portion depends on the number of sets of paired end effectors. In further embodiments, each pair 155 of end effectors 140, 160 have a pair of discrete tracks. Thus, an IML end effector and an OML end effector in each of the paired sets of end effectors work on different tracks from each other as they perform work over an arc.

Structure 110 is held in its current cross-sectional shape by braces 112, although other embodiments may not have these braces 112 and may maintain the shape of the structure 110 through other means. An example of the braces 112 is shown in FIG. 3 as braces 370. In further embodiments, structure 110 includes a section 114 of manufacturing excess/sacrificial material that may be used to facilitate indexing and/or transport of structure 110 during assembly operations. Structure 110 also includes locations (e.g., fastener installation locations) along its length L, at which it is desired to install one or more fasteners 102. The fasteners 102 are installed in a hoop-wise portion 126. For example, a hoop-wise portion 126 can be defined at each fastener installation location 116 and extend at least partially across the curved section 122. In some embodiments, structure 110 also includes a cut-out (not shown, but made by a later-visited work station) in or to which a surround 119 may be placed. The surround 119 can be secured to the structure 110 at the fore portion, the aft portion, and/or the perimeter of the surround 119. This may depend upon the work station and/or pulsed line system. For example, some work stations may install frames, such as frames 1140 (shown in FIG. 13), to a structure 110 comprising a skin, such as skin 1142 (shown in FIG. 13), while other work stations may install surrounds 119 around locations where openings within a structure 110 will be installed.

Structure 110 has a radius R. The radius of fixed inner track 130 (including IML end effector) (R_INNER) is less than R. Furthermore, the radius of fixed outer track 150 (including OML end effector) (R_OUTER) is greater than R. However, the fixed inner track 130 and the fixed outer track 150 do not have to have a fixed radius along their entire lengths, so long as there is a gap G for structure 110 to pass through. This is because the end effectors 140, 160 can compensate for any distance variation between a particular track location and the IML surface (e.g., IML surface 316 in FIG. 3) or OML surface (e.g., OML surface 318 in FIG. 3) of the structure 110. This means that structure 110 may move without obstruction through the gap G between IML end effector and OML end effector. Thus, the fixed outer track 150 is disposed at an OML side 106 of the fastener installation system 100 and/or the structure 110 and is shaped to enable an OML end effector to follow the OML surface of a structure 110. Similarly, the fixed inner track 130 is disposed along an IML side 108 of the fastener installation system 100 and/or structure 110 and is shaped to enable an IML end effector to follow the IML surface of the structure 110.

IML end effector and OML end effector may comprise, for example, four- or five-axis machines that include automated tools for fastener installation (e.g., drills, clamps, suction elements, swage tools, etc.). In further embodiments, the end effectors 140, 160 discussed herein are capable of extending, retracting, or otherwise repositioning in order to account for separation between their tracks and the IML surface (e.g., IML surface 316 shown in FIG. 3) or OML surface (e.g., OML surface 318 shown in FIG. 3) of the structure 110. The end effectors 140, 160 may be capable of performing this action regardless of whether the amount of separation varies along the tracks.

In further embodiments, the radii of the fixed inner track 130 and the fixed outer track 150 vary, and associated end effectors 140, 160 dynamically move to account for varying distances from the tracks to the structure 110 as work progresses. In still further embodiments, to help avoid end effector collisions, fixed tracks of differing radii occupy different sides of the structure 110. For example, a fixed outer track 150 on the right may exhibit a ten foot (3.5 meter) radius, while a fixed outer track 150 on the left may exhibit an eleven foot (3.35 m) radius and a fixed outer track 150 on the center may exhibit a ten and a half foot (3.20 m) radius.

The operations of IML end effector and OML end effector are coordinated via server 170. In one embodiment, controller 174 of server 170 accesses instructions in a Numerical Control (NC) program stored in memory 176 to direct the actions of the end effectors 140, 160, and transmits the instructions via an interface (i.e., I/F 172). Controller 174 may be implemented, for example, as custom circuitry, as a hardware processor executing programmed instructions, or some combination thereof.

Illustrative details of the operation of fastener installation system 100 will be discussed with regard to FIG. 2. In one embodiment, structure 110 has completed inspection via Non-Destructive Imaging (NDI) techniques, and is ready to be passed between a fixed inner track 130 and a fixed outer track 150 in order for fastener installation to commence. Furthermore, in this embodiment, fixed inner track 130 is complementary (e.g., matches) the contour of an inner surface (e.g., IML) of the structure 110, and fixed outer track 150 is complementary to the contour of an outer surface (e.g., OML) of the structure 110.

Figure 2:
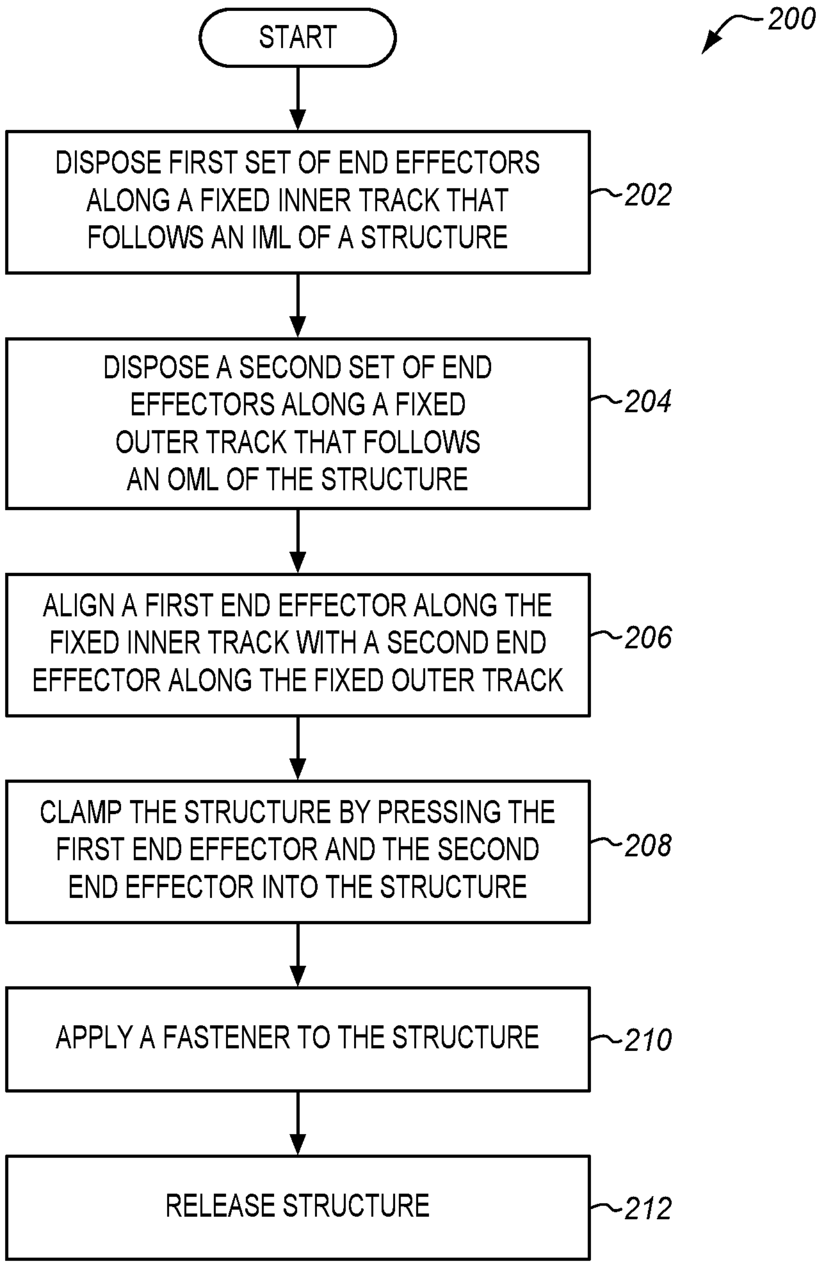
FIG. 2 is a flowchart illustrating a method for performing fastener installation in an illustrative embodiment using the fastener installation systems shown in FIGS. 1 and 3-6.

FIG. 2 is a flowchart illustrating a method 200 for operating a fastener installation system in an illustrative embodiment. The steps of method 200 are described with reference to fastener installation system 100 of FIG. 1, but those skilled in the art will appreciate that method 200 may be performed in other systems. The steps of the flowcharts described herein are not all inclusive and may include other steps not shown. The steps described herein may also be performed in an alternative order.

Referring to FIG. 1 and FIG. 2, in disposing 202, a first set (e.g., first set 340 shown in FIG. 3) of one or more of IML end effectors are disposed along the fixed inner track 130. The fixed inner track 130 facilitates operation of the IML end effectors to follow a curved IML, of the structure 110. For example, the IML, end effectors move without touching the IML surface (e.g., IML surface 316 shown in FIG. 3) of the structure 110, but remain close enough to contact the IML surface of the structure 110 at selected positions along the IML surface of the structure 110 to install fasteners 102. The first set of IML end effectors may comprise end effectors 140 that each occupy a different radial portion of the fixed inner track 130 (and hence each follow a different arc that is complementary to the curved IML of the structure 110). An example of this is shown in FIGS. 3-6. Any number N of IML end effectors may be arranged for pairing with the OML end effectors discussed below with regard to step 204. Disposing 202 the IML end effectors along the fixed inner track 130 may comprise mounting the IML end effectors at the fixed inner track 130 such that the IML end effectors are capable of adjusting their position along the structure 110 (e.g., by traveling along the fixed inner track 130).

In step 204, a second set (e.g., second set 360 shown in FIG. 3) of one or more of the OML end effectors are disposed along fixed outer track 150. The fixed outer track 150 facilitates operation of the OML end effectors to follow a curved OML of the structure 110. For example, the OML end effectors move without touching the OML surface (e.g., OML surface 318 shown in FIG. 3) of the structure 110, but remain close enough to contact the OML surface of the structure 110 at selected positions along the OML surface of the structure 110 to install fasteners 102. The second set of OML end effectors may comprise end effectors that each occupy a different radial position along fixed outer track 150, as shown in FIGS. 3-6. Disposing the OML end effectors along fixed outer track 150 may comprise mounting the OML end effectors at the fixed outer track 150 such that the end effectors 160 are capable of adjusting their position along the structure 110 (e.g., by traveling along the fixed outer track 150).

An aspect of disposing 202 the first set 340 and step 204 the second set 360 includes assigning the end effectors 140, 160. More specifically, and referring to FIGS. 1, 2, and 4, the method 200 can further include assigning end effectors 140, 342, 344, 346 in the first set 340 to different radial zones at the structure 110, 310 and assigning end effectors 160, 362, 364, 366 in the second set 360 to the different radial zones at the structure 110, 310. Each end effector 140, 342, 344, 346 in the first set 340 and each end effector 160, 362, 364, 366 in the second set 360 is operated exclusively within the radial zones 410, 420, 430 that the end effectors 140, 342, 344, 346 and 160, 362, 364, 366 have been assigned to.

In step 206, a first end effector along the fixed inner track (e.g., an IML end effector along a fixed inner track 130) is aligned with a second end effector along the fixed outer track (e.g., an OML end effector along a fixed outer track 150). The alignment may comprise placing both the first end effector and the second end effector at the same location/position along the curvature of the structure 110. A structural component desired to be affixed to the structure 110 may also be aligned with the end effectors 140, 160. For example, in embodiments where the structure 110 is a fuselage portion 308 of a fuselage (e.g., fuselage 1119 shown in FIGS. 12 and 13), a curved frame, such as the frame 1140 (shown in FIG. 13), for the fuselage may be aligned with the end effectors 140, 160 so that installation of a fastener 102 secures the frame 1140 to a skin (e.g., the skin 1142 shown in FIG. 13) of the fuselage 1119. The frame 1140 itself may be indexed using notches or holders disposed at the fixed inner track 130, if desired. In this manner, the position of the fixed inner track 130 relative to the structure 110 is used to locate and hold frames 1140 for installation at the IML, surface of the structure 110. In further embodiments, the frames 1140 are held by other components such as guides or rails that are discrete from the components discussed herein.

Figure 13:
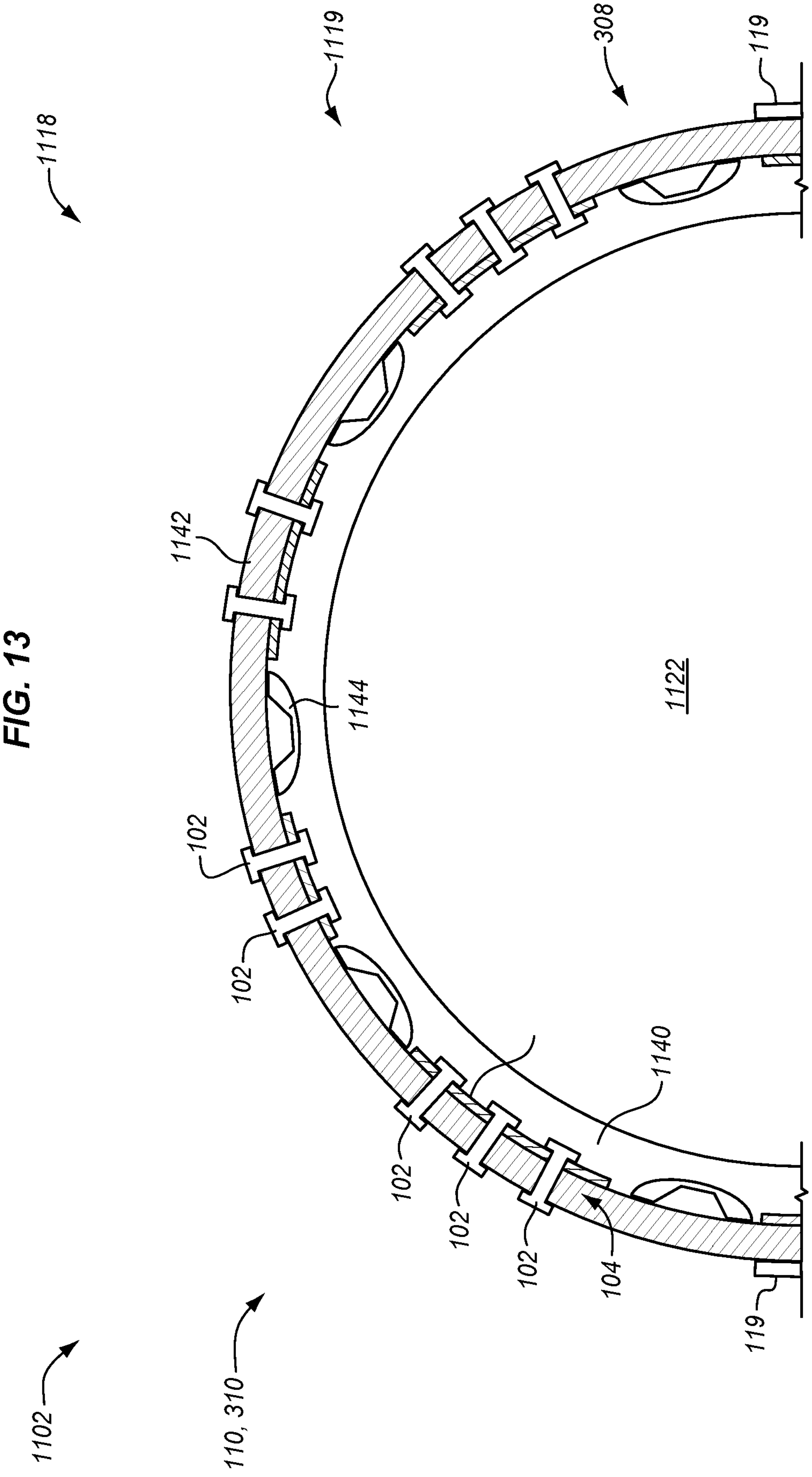
FIG. 13 is a cross-sectional view of an airframe that can be used with the aircraft of FIG. 12 and manufactured using the fastener installation systems shown in FIGS. 1 and 3-6 and/or the methods shown in FIGS. 1 and 7-10.

Any structure that is fastened directly to the structure 110 (e.g., a skin 1142 of a fuselage 1119 as shown in FIG. 13) could be installed via the operations of the end effectors 140, 160 discussed herein. These structures include door surrounds or window surrounds, such as the surround 119. Fasteners 102 for door or window surrounds within reach of a pair 155 of end effectors 140, 160 can be installed during one pause between pulses of the fuselage structure, and fasteners 102 within reach during a next pause between pulses can then be installed by the same end effectors. In this way, the fasteners 102 around a perimeter of an opening in structure 110 are installed. In further examples, the structural component may comprise another section of fuselage that will be longitudinally spliced with a current section of fuselage in order to form a longer section of fuselage. In still further examples, fuselage panels that each comprise a portion of the radius of a fuselage may be joined in a butted or lapped longitudinal splice to form a more complete fuselage section circumferentially.

In a further embodiment, the IML end effectors and the OML end effectors are capable of moving longitudinally with respect to structure 110, in order to install longitudinal splice fasteners within a certain reach of a work station in the series of work stations, as described in more detail with respect to FIG. 3. These end effectors 140, 160 can move horizontally over a short length, installing splice fasteners in order to assemble half barrel sections from individual barrel sections each comprising one-sixth of a barrel. These smaller barrel sections are tacked together with temporary fasteners prior to permanent fastener installation. This fastener installation system 100 is capable of being used to form half barrel sections for either composite or metallic aircraft production. In this manner, metallic aircraft can be assembled in a pulsed line.

In step 208, the structure 110 is clamped by pressing the first end effector, such as the IML, end effector, and the second end effector, such as the OML end effector, into the structure 110. For example, a "one-up" clamping may be performed via application of a suction element in one of the end effectors 140, 160 to the structure 110, or a clamp may be performed by pressing an end effector 140 at the fixed inner track 130 against the structure 110 and an end effector 160 at the fixed outer track 150, thereby sandwiching the structure 110 in place between the end effectors 140, 160. This enables operations of sealing, drilling, and fastener installation to be performed in one single process, which can eliminate the need to match drill all of the holes 104 in a panel assembly and take structures apart for cleaning and deburring before adding sealant, reassembling, and installing fasteners. Drilling a fastener hole may include drilling a countersink hole.

In step 210, the fastener 102 is applied to the structure 110. Applying the fastener 102 to the structure 110 can include drilling a hole 104 through the structure 110 using at least one of the end effectors 140, 160. For example, in an embodiment where the fastener 102 is a lockbolt, the second end effector may drill out a hole 104 in the structure 110 and drive a lockbolt through the hole 104, and the first end effector may dispose a collar over the lockbolt and swage the collar into place. In one embodiment, applying the fastener 102 comprises inserting a fastener 102 into the fastener hole. In one embodiment, the structure 110 comprises a fuselage portion 308 (shown in FIG. 3) of a fuselage of an aircraft, and applying the fastener 102 comprises driving the fastener through a frame (e.g., the frame 1140 shown in FIG. 13) disposed at the IML, surface (e.g., IML, surface 316 shown in FIG. 3) of the structure 110 (e.g., the fuselage portion 308 shown in FIG. 3) as well as the structure 110 itself. During step 208 and step 210, forces applied during clamping and fastener installation are transferred through the end effectors 140, 160 and into the fixed tracks. At step 212, the structure 110 is released by separating the first end effector and the second end effector from the structure 110. After step 212, the end effectors 140, 160 can be moved to a different fastener installation location on the structure 110 and/or the structure 110 can be moved to a subsequent work station and/or pulsed line system in the pulsed manufacturing line 10.

Steps 206-212 may be iterated multiple times each time that the structure 110 is paused in the same work station or to a different work station, in order to install a large number of fasteners 102 along different radial positions. The iteration may comprise moving the first end effector and the second end effector to a new position along a curvature of the structure 110 (see, e.g., step 206), clamping the structure 110 by pressing the first end effector and the second end effector into the structure 110, and applying another fastener 102 to the structure 110.

Method 200 can provide a substantial technical benefit over prior solutions, because method 200 can ensure that mobile end effectors, such as end effectors 140, 160, may be utilized to install fasteners 102 at a variety of locations along a contoured structure 110. Furthermore, because the end effectors 140, 160 are disposed along fixed tracks, such as tracks, the end effectors 140, 160 can reliably install fasteners 102 in the same positions along the contour of the structure 110, regardless of the amount of distance that the structure 110 has traveled along rail 120. Hence, unlike flexible track systems that can require installation and removal of a track within the fuselage itself (e.g., for each of multiple portions along the length of the fuselage), the fastener installation system 100 having fixed tracks described herein may be rapidly operated by moving the structure 110 lengthwise, pausing the structure 110, applying fasteners 102, and then moving the structure 110 lengthwise again. Moving lengthwise moves the structure 110 in the longitudinal direction 103.

Furthermore, flex track systems can rely upon a structure already being assembled in order to provide structural support for the track, while method 200 utilizes a track that is structurally independent of structure 110. Still further, flex track systems can require that the track and end effector be moved to a particular location at a structure 110. In the present system, the structure 110 is moved to the track and fasteners 102 are installed in pulses in between movements of the structure 110 along the pulsed manufacturing line 10. Therefore, after each pulse of movement of structure 110, the structure 110 can be rapidly indexed to the tracks before work begins. Fastener installation is then performed, work is stopped, and a next portion of the structure 110 is brought into range of the end effectors 140, 160 on the fixed tracks for additional fastener assembly.

FIGS. 3-6 illustrate fastener installation in a specific embodiment where the structure 110 (shown in FIG. 1) is a structure 310 that comprises a fuselage portion 308, such as a half-barrel section of a fuselage, having a constant cross-section along its length. The fuselage portion 308 described with respect to FIGS. 3-6 can be a portion of the fuselage 1119 shown in FIG. 12.

FIG. 3 is a perspective view of a fastener installation system 300 in an illustrative embodiment. The fastener installation system 300 is a particular example of the fastener installation system 100 shown schematically in FIG. 1. In this embodiment, fastener installation system 300 includes rails 320 which are installed at a factory floor 322. The rails 320 are an example of the rail 120 shown in FIG. 1. The rails 320 move the structure 310 in a longitudinal direction 103 toward and/or through the fastener installation system 300. Mobile carts 314 travel along the rails 320 and include clamps 312 which hold the structure 310 in the form of a half-barrel section of an aircraft fuselage (e.g., fuselage 1119 shown in FIGS. 12 and 13) having an IML surface 316 and an OML surface 318. Braces 370 disposed at ends of the structure 310 help to retain an arcuate shape of the structure 310 during transport. However, in further embodiments the brace 370 is omitted. The braces 370 are an example of the braces 112 shown in FIG. 1.

Figure 5:
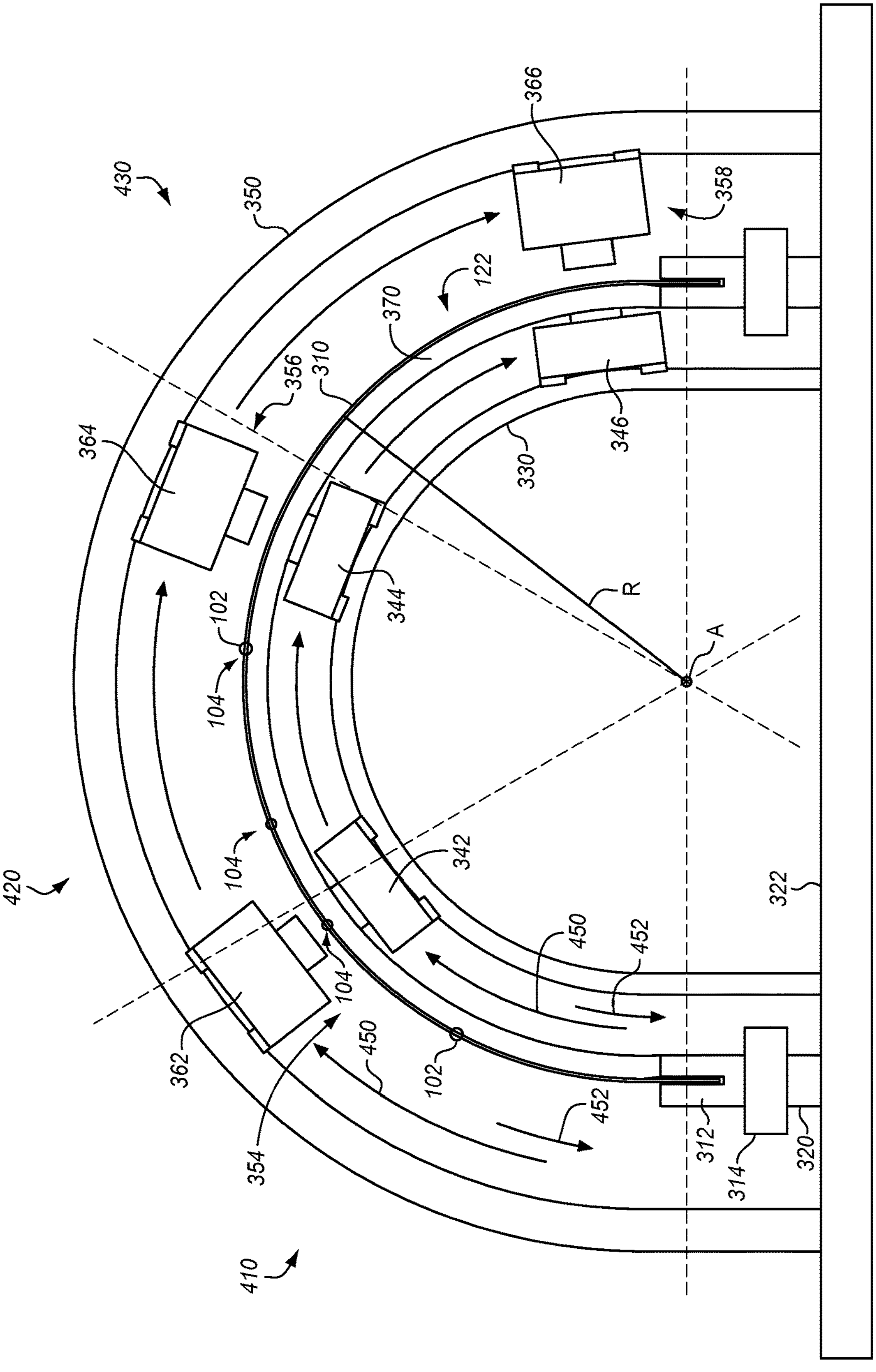
FIG. 5 is an end view of the fastener installation system of FIG. 3 after receiving a structure in an illustrative embodiment.
Figure 6:
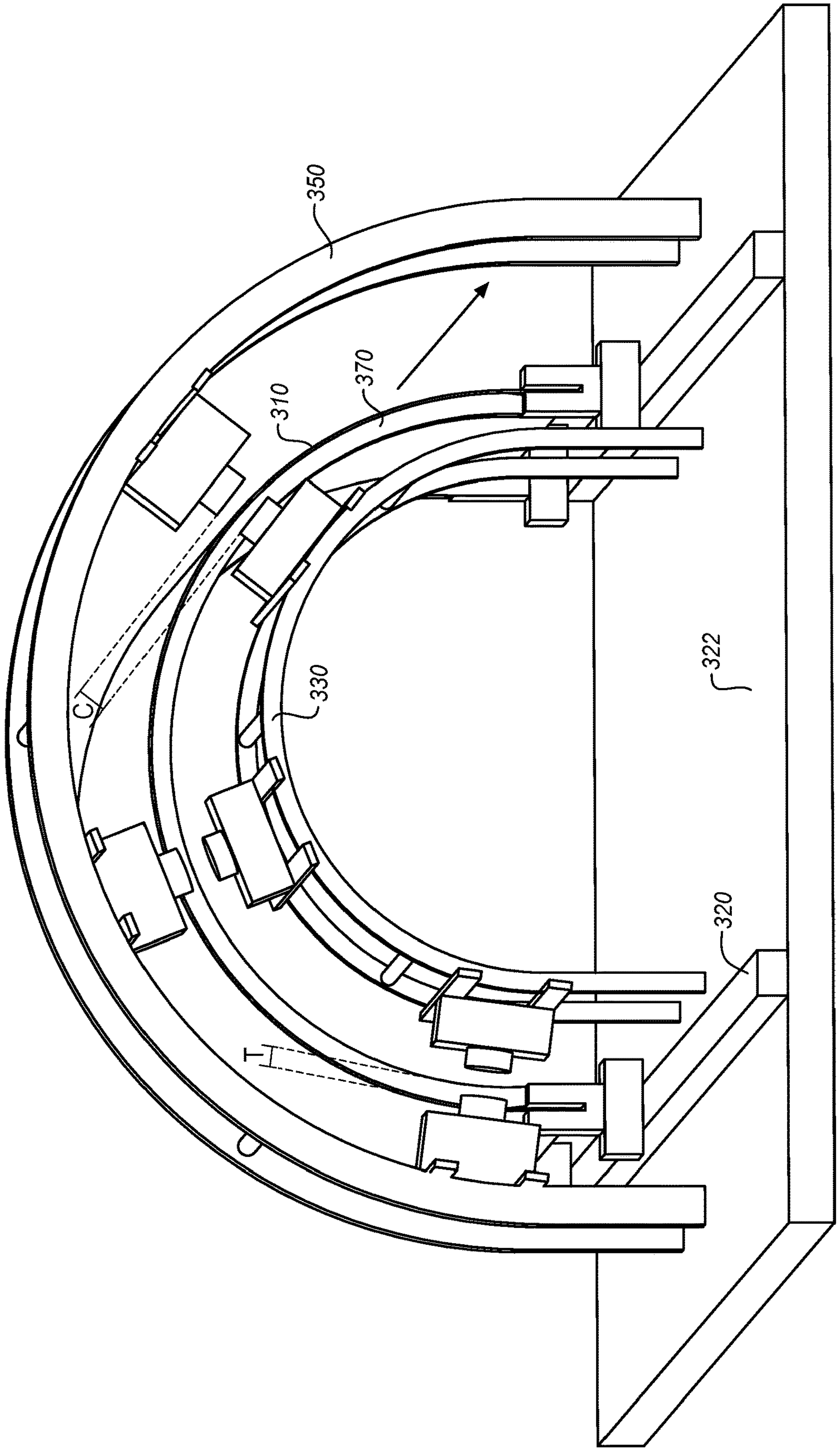
FIG. 6 is a further perspective view of the fastener installation system of FIG. 3 in an illustrative embodiment.

During assembly operations, structure 310 proceeds within the gap G between a fixed inner track 330 and a fixed outer track 350. The fixed inner track 330 is an example of the fixed inner track 130 shown in FIG. 1, and the fixed outer track 350 is an example of the fixed outer track 150 shown in FIG. 1. The fixed inner track 330 is positioned on an IML side 108 of the fastener installation system 300 and/or the structure 310, and the fixed outer track 350 is positioned on OML side 106 of the fastener installation system 300 and/or structure 310. Fixed inner track 330 has a first set 340 of end effectors 342, 344, and 346 disposed along a first semicircle 332. The end effectors 342, 344, and 346 are each an example of the IML, end effector shown in FIG. 1. Fixed outer track 350 has a second set 360 of end effectors 362, 364, and 366 disposed along a second semicircle 352. The end effectors 362, 364, and 366 are each an example of the OML end effector shown in FIG. 1. Referring to FIG. 4, each IML end effector is paired up with a respective OML end effector to create pairs 354, 356, 358 of end effectors. Each pair is an example of a pair 155 as shown in FIG. 1. Although three pairs 354, 356, 358 of end effectors are shown in FIGS. 4-6, any number of pairs 354, 356, 358 can be included in the fastener installation system 300.

As shown in FIG. 3, the second semicircle 352 is larger than the first semicircle (i.e., has a larger diameter) and is concentric with the first semicircle 332. When structure 310 is placed between the first semicircle 332 and the second semicircle 352, the IML surface 316 and OML surface 318 are also concentric with first semicircle 332. The motion of structure 310 in the direction indicated by the arrow is periodically paused, causing the structure 310 to move in pulses as the structure 310 proceeds between the fixed tracks. During each pause, the end effectors 342, 344, 346 and 362, 364, 366 of the fixed inner track 330 install fasteners 102 (shown in FIG. 5) into holes 104 (shown in FIG. 5) along the contour of the structure 310. The structure 310 is then moved again, presenting another hoop-wise (or half-barrel-shaped) portion of the structure 310 along the length L of the structure 310 for receiving fasteners 102.

In a further embodiment, the structure 310 is pulsed a distance equal to the space between fastener installation locations, such as fastener installation locations (shown in FIG. 1), in the longitudinal direction 103 and longitudinal rows of fasteners are installed, such as for lap or butt splices to join fuselage panels. In still further embodiments, multiple end effector pairs install fasteners 102 for longitudinal splices and then switch to installing fasteners in a hoop-wise fashion to install frames, such as securing the frame 1140 to the skin 1142 as shown in FIG. 13.

In one embodiment, end effectors 342, 344, 346 and 362, 364, 366 on the fixed inner track 330 and the fixed outer track 350 are also capable of limited longitudinal motion in the longitudinal directions 380 indicated by the arrow. The OML end effectors move synchronously with the IML end effectors in the longitudinal direction 380. In such an embodiment, the IML, end effectors are coupled to the fixed inner track 330 via inner longitudinal rails 372. Similarly, the OML end effectors are coupled to the fixed outer track 350 via outer longitudinal rails 3734. The IML end effectors move with respect to the fixed inner track 330 in the longitudinal directions 380 along the inner longitudinal rails 372. The OML end effectors move with respect to the fixed outer track 350 in the longitudinal directions 380 along the outer longitudinal rails 374. This may facilitate certain assembly operations, such as those related to performing longitudinal splices.

FIG. 4 is an end view of the fastener installation system 300 prior to receiving the structure 310, and corresponds with view arrows 4 of FIG. 3. In FIG. 4, a controller, such as the controller 174 shown in FIG. 1, has assigned IML end effectors to different radial zones at the structure 310 and has also assigned OML end effectors to the different radial zones at the structure 310. While three pairs 354, 356, 358 of end effectors and three radial zones 410, 420, 430 are shown, in further embodiments any suitable number of pairs and radial zones can be utilized.

Each IML end effector in the first set 340 and each of the OML end effectors in the second set 360 is operated exclusively within the radial zone 410, 420, or 430 that it has been assigned to. Specifically, the end effectors 342, 344, 346 and 362, 364, 366 are grouped into pairs 354, 356, 358 (one inner end effector and one outer end effector) that each operate in a coordinated fashion to install fasteners 102 in a separate radial zone/portion of the structure 310. For example, end effector 342 and end effector 362 operate together as a pair 354 in radial zone 410 disposed between boundary 402 and boundary 412, end effector 344 and end effector 364 operate together as a pair 356 in radial zone 420 disposed between boundary 412 and boundary 422, and end effector 346 and end effector 366 operate together as a pair 358 in radial zone 430 disposed between boundary 422 and boundary 432.

In further embodiments, radial zones 410, 420, 430 are not exclusive and therefore partly overlap, which facilitates the ability of end effectors 342, 344, 346 and 362, 364, 366 to perform fastener installation in boundary areas between radial zones. For example, at least two of the radial zones 410, 430 partially overlap another radial zone 420. Actions performed by pairs 354, 356, 358 of end effectors are coordinated to prevent collisions between end effectors 342, 344, 346 and 362, 364, 366 in different pairs. For example, the controller 174 may operate pairs 354, 356, 358 of end effectors such that the end effectors 342, 344, 346 and 362, 364, 366 proceed in a first circumferential direction (e.g., clockwise) together across their respective radial portions, and then proceed in a second circumferential direction (e.g., counterclockwise) together across their respective radial portions. This ensures that the pairs 354, 356, 358 of end effectors remain separated by a desired amount of empty space in order to prevent collisions.

In one embodiment, the motions of the end effectors 342, 344, 346 and 362, 364, 366 are preprogrammed into the NC programing saved in the memory 176 (shown in FIG. 1) for the end effectors 342, 344, 346 and 362, 364, 366 to help ensure collision avoidance. In further embodiments, NC programming is supplemented with proximity sensors (e.g., laser sensors, cameras, ultrasonic sensors, etc.) that provide input used by the controller 174 to automatically pause or alter operations of the end effectors 342, 344, 346 and 362, 364, 366 in order to perform collision avoidance. In this manner, fastener installation may include moving the first set 340 of end effectors and the second set 360 of end effectors along a first circumferential direction, such as the clockwise direction 450, to apply multiple fasteners 102, and moving the first set 340 of end effectors and the second set 360 of end effectors along a second circumferential direction, such as the counterclockwise direction 452, that is opposed to the first circumferential direction to apply additional fasteners (e.g., after the structure 310 has been pulsed).

FIG. 5 is an end view of the fastener installation system 300 after receiving the structure 310. That is, structure 310 has been pulsed along rails 320 to a location where a portion of structure 310 ready for fastener installation is disposed between fixed inner track 330 and fixed outer track 350. In FIG. 5, structure 310 is illustrated disposed between fixed inner track 330 and fixed outer track 350. Assume for this depiction that movement of structure 310 has paused. Also in this end view, the curved section 122 of the structure 310 is shown.

The pairs 354, 356, 358 of end effectors proceed to install fasteners 102 into holes 104 within their corresponding zones in a hoop-wise direction as the end effectors 342, 344, 346 and 362, 364, 366 perform coordinated sweeps in clockwise or counterclockwise directions (or both) during fastener installation. In one embodiment, the end effectors 342, 344, 346 and 362, 364, 366 initiate in the positions depicted in FIG. 5 and work in a counterclockwise direction 452 until stopping at the far end of the counter clockwise arc. The end effectors 342, 344, 346 and 362, 364, 366 then wait until the next pulse/movement of the structure 310 and work in a clockwise direction 450 toward the starting point shown in FIG. 5. That is, after each pulsed movement of the structure 310 through the fastener installation system 300, the end effectors 342, 344, 346 and 362, 364, 366 switch their direction of operation from the counterclockwise direction 452 to the clockwise direction 450. Thus, all of the end effectors 342, 344, 346 and 362, 364, 366 work in the counterclockwise direction 452, then wait for a pulsed movement, then work in the clockwise direction 450, then wait for a pulsed movement, and so on. This iterative, coordinated movement between the end effectors 342, 344, 346 and 362, 364, 366 and the structure 310 may be performed without any type of "carriage return" type of operation.

In another embodiment, the pairs 354, 356, 358 of end effectors install fasteners 102 in the clockwise direction 450 until reaching the end of their radial zone 410, 420, or 430, and then reset in the counterclockwise direction 452 back to the beginning of their radial zone 410, 420, 430 in a manner similar to operating a carriage return of a typewriter. Thus, the pairs 354, 356, 358 of end effectors all work in the clockwise direction 450 after a pulsed movement, then return to their starting positions and work in the clockwise direction 450 again after a next pulsed movement. Similar operations may, of course, be performed for counterclockwise operation instead of clockwise operation.

In still further embodiments, after the structure 310 has been pulsed, the end effectors 342, 344, 346 and 362, 364, 366 move incrementally in one direction (e.g., clockwise, counterclockwise), and install fasteners 102 into holes 104 in between the pulsed movements, as each end effector 342, 344, 346 and 362, 364, 366 proceed across its radial zone 410, 420, 430. Then the end effectors 342, 344, 346 and 362, 364, 366 move in an opposite direction back to a starting point in order to prepare for installing fasteners after the structure 310 has been pulsed again. The structure 310 may then be pulsed to the next fastener installation location (shown in FIG. 1) on the structure 310, and the pairs 354, 356, 358 of end effectors proceed to install fasteners into holes 104 as the pairs 354, 356, 359 move in the counterclockwise direction 452.

In a still further embodiment, the fixed inner track 330 are located closer to the IML, surface 316 or OML surface 318 of the structure 310, such that IML, end effectors are located between the structural portions of the fixed inner track 330 (or even inboard of the fixed inner track 330) and the fixed inner track 330 is located just off of the IML surface 316 on which work is to be performed. In a similar fashion, OML end effectors are located between structural components of the fixed outer track 350 (or even outboard of the fixed outer track 350) and the fixed outer track located just off of the OML surface 318 on which work is to be performed.

In yet further embodiments, one longitudinally moving end effector is provided per rail 320. Referring to FIGS. 1 and 3, the fastener installation system 300 can also have adjacent frame installation stations, wherein end effectors 342, 344, 346 and 362, 364, 366 in each station operate in different circumferential directions, or in the same circumferential direction, such as the clockwise direction 450 or the counterclockwise direction 452 (e.g., to install a splice between half-barrel sections, or to install a window or door surround). Each frame installation station of the fastener installation system 300 includes a fixed inner track 330, a fixed outer track 350, one or more IML end effectors associated with the fixed inner track 330, and one or more OML end effectors associated with the fixed outer track 350.

FIG. 6 is a further perspective view of the fastener installation system 300 that corresponds with view arrows 6 of FIG. 3. As shown in FIG. 6, a clearance C between the IML end effectors along the fixed inner track 330 and the OML end effectors along the fixed outer track 350 is greater than a thickness T of brace 370. This spacing ensures that structure 310 may proceed between the fixed inner track 330 without encountering physical interference.

FIGS. 7-11 illustrate further methods for performing fastener installation using the fastener installation system 100, 300 (shown in FIGS. 1 and 3). The methods 700, 800, 900, and 1000 include pulsing the structure 110, 310 towards and/or through the fastener installation system 100, 300. Pulsing enables the methods 700, 800, 900, 1000 to install fasteners 102 by attaching the fasteners 102 along the longitudinal portion 124 of the structure 110, 310, which attaches the fasteners 102 along the longitudinal axis A of the structure 110, 310. The installation of the fasteners 102 can secure a component, such as a frame 1140 (shown in FIG. 13) or a surround 119 (shown in FIGS. 1 and 13) to the structure 110, 310 (e.g., a fuselage portion 308 having skin 1142).

Method 700 provides an alternate technique for utilizing the end effector and track systems discussed herein in an illustrative embodiment. According to method 700 of FIG. 7, step 702 comprises pulsing a structure 110, 310 (shown in FIGS. 1 and 3) comprising a fastener installation location 116 towards the fastener installation system 100, 300. For example, the structure 110, 310 is moved in the longitudinal direction 103 shown in FIG. 3. During the pulsing, the structure 110, 310 is moved along the rail 120, 320 that is part of the pulsed manufacturing line 10. In one embodiment, pulsing includes moving the structure 110 longitudinally (e.g., a distance of eight feet (2.44 meters)) towards and/or through the fastener installation system 100, 300. For example, during a pulse, the structure 110, 310 is moved in the longitudinal direction 103 by a predetermined distance. The motion of structure 110, 310 may then be paused in order for work to be performed by the fastener installation system 100, 300.

In step 704, at least one fastener is installed at the fastener installation location 116 via end effectors 140, 342, 344, 346 and 160, 362, 364, 366 (shown in FIGS. 1 and 3) that are supported by tracks (shown in FIGS. 1 and 3) that are independent of the structure 110, 310. Step 704 may be performed via the coordinated end effector operations discussed above with regard to method 200 of FIG. 2. The installation can include attaching fasteners 102 along the curved section 122 (shown in FIG. 5) of the structure 110, 310. Further, the installation can include attaching the fasteners 102 along the longitudinal portion 124 of the structure 110, 310. Longitudinal operations may further support installation of fasteners 102 for door surrounds, stringer splices, or other components.

Method 800 provides a further alternate technique for utilizing the end effector and track systems discussed herein in an illustrative embodiment. According to method 800 of FIG. 8, step 802 comprises pulsing a structure 110, 310 comprising a fastener installation location 116 towards the fastener installation system 100, 300 (shown in FIGS. 1 and 3). In one embodiment, pulsing the structure 110, 310 comprises moving structure 110, 310 longitudinally towards and/or through the fastener installation system 100, 300 (e.g., by four feet (1.22 meters), eight feet (2.44 meters), etc.). The motion of structure 110, 310 may then be paused in order for work to be performed by the fastener installation system 100, 300. This is similar to step 702 in method 700 in FIG. 7.

In step 804, the structure 110 is clamped between an IML end effector and an OML end effector at the fastener installation system 100, 300. The clamping may be performed by pressing the end effectors 140, 342, 344, 346 and 160, 362, 364, 366 towards each other while the end effectors 140, 342, 344, 346 and 160, 362, 364, 366 are disposed over a fastener installation location 116, as described with respect to steps 206 and 208 in FIG. 2. Step 804 is performed while movement of the structure 110, 310 is paused.

In step 806, a fastener 102 is installed at the structure 110, 310 via the IML, end effector and the OML end effectors. The installation may comprise the end effectors 140, 342, 344, 346 and 160, 362, 364, 366 performing drilling a hole 104, cleaning the hole 104, and installation of the fastener 102 into the hole 104 in a desired location. This may be performed via the coordinated end effector operations discussed above with regard to method 200 of FIG. 2 and, more specifically, via step 210. The installation can include attaching fasteners 102 along the curved section 122 (shown in FIG. 5) of the structure 110, 310. Further, the installation can include attaching the fasteners 102 along the longitudinal portion 124 of the structure 110, 310.

In further embodiments, a one-up assembly may be performed as the method 800 via the end effectors 140, 342, 344, 346 and 160, 362, 364, 366 discussed herein, wherein forces applied by the end effectors 140, 160 during drilling and fastener installation are resisted by one or more indexing elements that hold the structure 110, 310 in place. Further, forces applied during clamping and fastener installation are transferred through the end effectors 140, 160 and into the tracks.

Method 900 provides a technique for utilizing an end effector that moves longitudinally/lengthwise with respect to a structure to facilitate fastener installation. Method 900 could be used when the fastener installation system 100, 300 has end effectors 342, 344, 346 and 362, 364, 366 on the fixed inner track 330 and the fixed outer track 350 that are capable of limited longitudinal motion in the longitudinal directions 380 shown in FIG. 3.

Figure 7:
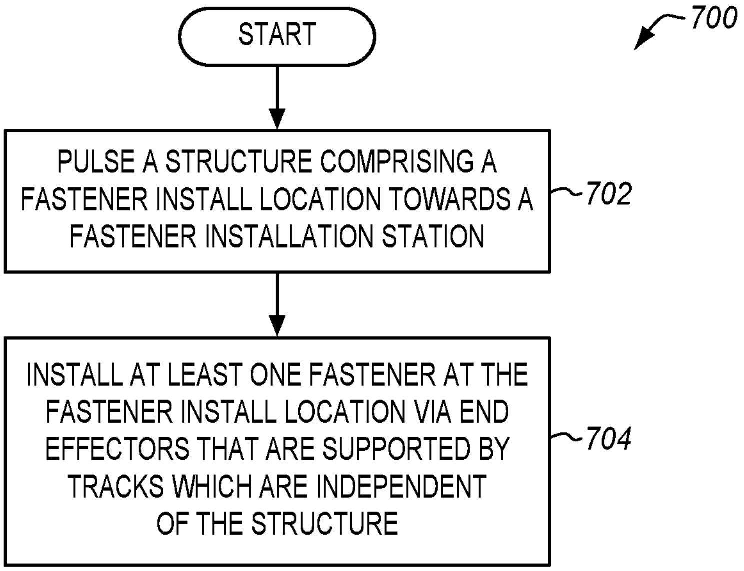
FIGS. 7-10 illustrate further methods for performing fastener installation in illustrative embodiments using the fastener installation systems shown in FIGS. 1 and 3-6.
Figure 8:
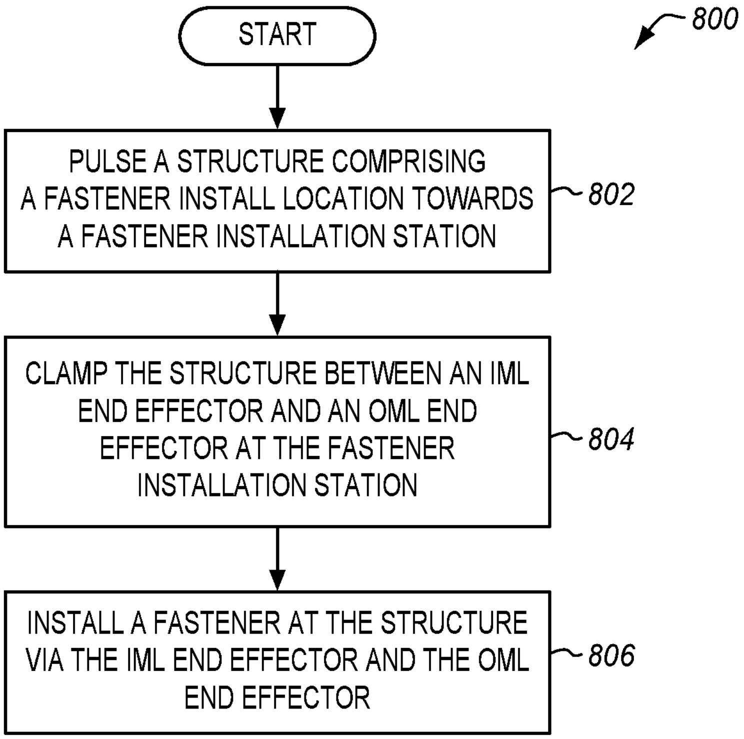
Figure 9:
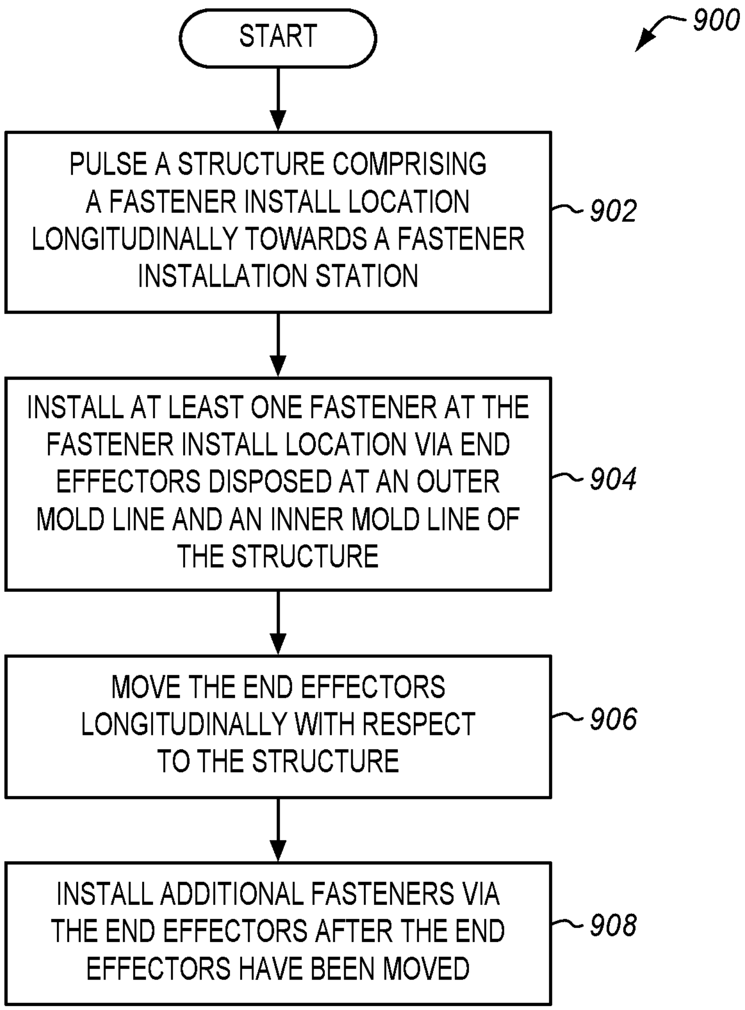
Figure 10:
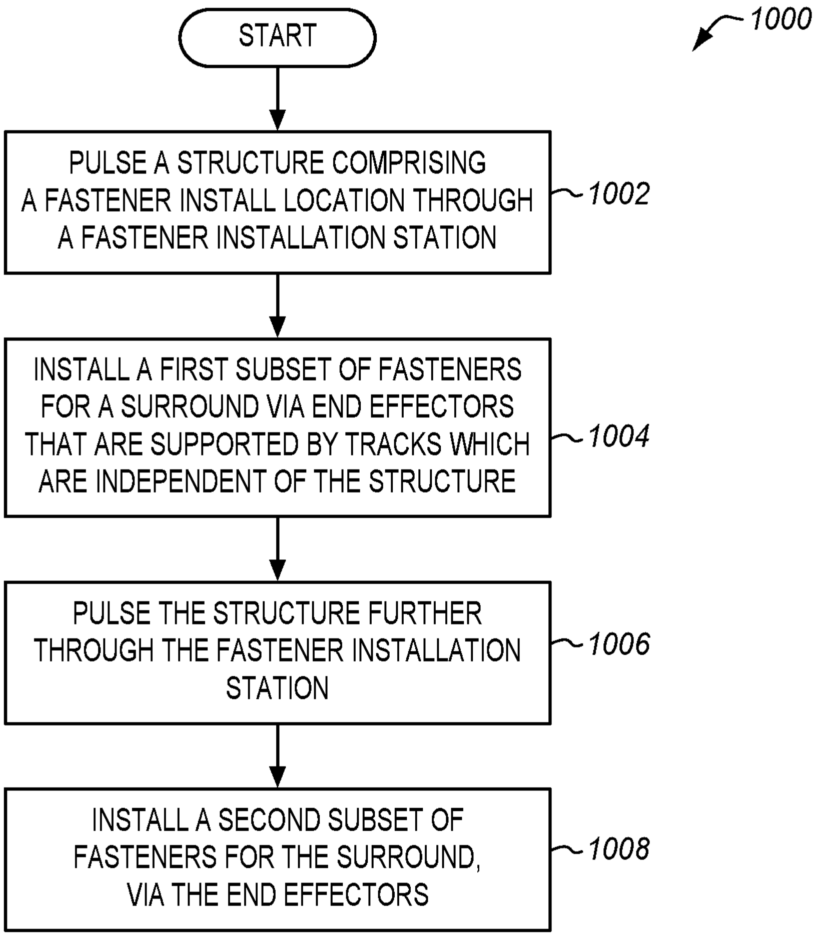

According to method 900, step 902 includes pulsing the structure 110, 310 comprising a fastener installation location 116 longitudinally towards and/or through the fastener installation system 100, 300, similarly to steps 702 and 802 described with respect to FIGS. 7 and 8. In step 904, at least one fastener is installed at the fastener installation location 116 via end effectors 140, 342, 344, 346 and 160, 362, 364, 366 disposed at an IML surface 316 and an OML surface 318 of the structure 110, 310. Installation step is similar to step 802 (shown in FIG. 8), step 704 (shown in FIG. 7), and step 210 (shown in FIG. 2).

In step 906, the end effectors 140, 342, 344, 346 and 160, 362, 364, 366 move in the longitudinal directions 380 with respect to the structure 110, 310. For example, the end effectors 140, 342, 344, 346 and 160, 362, 364, 366 move by independently traveling in the longitudinal direction 380 with respect to the fixed inner track 130, 330 and the fixed outer track 150, 350 along the inner longitudinal rails 372 and outer longitudinal rails 374, respectively.

In step 908, additional fasteners are installed via the end effectors 140, 342, 344, 346 and 160, 362, 364, 366 after the end effectors 140, 342, 344, 346 and 160, 362, 364, 366 have been moved. The installation is similar to step 904, and steps 904 and 908 can be performed as described with respect to method 200 (shown in FIG. 2). The installation can include attaching fasteners 102 along the curved section 122 (shown in FIG. 5) of the structure 110, 310. Further, the installation can include attaching the fasteners 102 along the longitudinal portion 124 of the structure 110, 310. In this manner, the end effectors 140, 342, 344, 346 and 160, 362, 364, 366 install fasteners 102 along newly exposed longitudinal portions 124 of the structure 110, 310. In further embodiments, the end effectors 140, 342, 344, 346 and 160, 362, 364, 366 also move in an arc-wise direction, such as a clockwise direction 450 and/or counterclockwise direction 452, relative to the structure 110, 310 during fastener installation, as shown in FIG. 5. In the manner of method 900, the end effectors 140, 342, 344, 346 and 160, 362, 364, 366 may perform a limited amount of longitudinal motion in order to enhance the ease of performing a lengthwise splice, stringer splices, or while installing intercostals, surrounds, clips/ supports, etc., even though structure 110, 310 is already being periodically pulsed in the longitudinal direction.

Method 1000 illustrates a technique for installing surrounds, such as surround 119 shown in FIGS. 1 and 13, in an illustrative embodiment. Step 1002 comprises pulsing a structure 110, 310 having a fastener installation location 116 towards and/or through the fastener installation system 100, 300. Step 1002 is similar to steps 902, 802, and 210 as previously described. Step 1004 includes installing a first subset of fasteners 102 for a surround 119 (e.g., a door surround, window surround, etc.) that will cover a later-placed cut-out in the structure 110, 310, via end effectors 140, 342, 344, 346 and 160, 362, 364, 366 that are supported by tracks, which are independent of the structure 110, 310. The first subset of fasteners 102 may comprise fasteners 102 installed at locations that are presently within reach of the end effectors 140, 342, 344, 346 and 160, 362, 364, 366. The installation of the fasteners 102 is similar to how the fasteners 102 are installed in the previously-described method (shown in FIG. 2).

Step 1006 comprises pulsing the structure 110, 310 further through the fastener installation system 100, 300. This operation is similar to step 1002 and makes remaining locations for installing fasteners in the surround 119 available to the end effectors 140, 342, 344, 346 and 160, 362, 364, 366. After each pulsing (and other pulsing steps described with respect to FIGS. 7-9), the method 1000 can include indexing the structure 110, 310. For example, the structure 110, 310 can be indexed using the section 114 of manufacturing excess/sacrificial material, using notches or holders disposed at the fixed inner track 130 and/or fixed outer track 150, and/or using one or more indexing elements that hold the structure 110, 310 in place.

In step 1008, a second subset of fasteners 102 are installed for the surround 119 via the end effectors 140, 342, 344, 346 and 160, 362, 364, 366, similarly to step 1004. In one embodiment, installing the second subset of fasteners 102 comprises distributing fastener installation operations for the surround 119 among different end effectors. The installing steps secure the surround 119 to the structure 110, 310, such that the surround will cover a cut-out in the structure 110, 310. The installing steps can be performed by at least one pair of end effectors 140, 160 operating on a fore portion of the surround 119, and by at least one other pair of end effectors 140, 160 operating on an aft portion of the surround 119, wherein the pairs 115 operate simultaneously on the fore portion and the aft portion.

Further, installation of the fasteners 102 can include attaching the fasteners 102 along the curved section 122 (shown in FIG. 5) of the structure 110, 310. Further, the installation can include attaching the fasteners 102 along the longitudinal portion 124 of the structure 110, 310.

Installing fasteners as discussed in the above methods 200, 700, 800, 900, 1000 may comprise attaching fasteners 102 along a hoop-wise portion 126 of a structure 110, 310, attaching fasteners 102 along a length L of the structure 110, 310, securing a surround 119 that covers a cut-out in the structure 110, 310 (e.g., by installing fasteners along a perimeter of the surround 119, via different end effectors), securing a frame 1140 to a skin 1142 of the structure 110, 310 (shown in FIG. 13), etc. The methods 700, 800, 900, and 1000 include iteratively pulsing the structure 110, 310 toward and/or through the fastener installation system 100, 300 and installing fasteners 102 to the structure 110, 310.

In one embodiment, the methods discussed above further include aligning an Outer Mold Line (OML) end effector and an Inner Mold Line (IML) end effector with the structure, and the installing the fasteners via the OML end effector and the IML, end effector. Other potential additional steps may include indexing the structure after the structure is pulsed. This may comprise placing the structure in a known location relative to the tracks (e.g., by placing the structure against an indexing element which is fixed in position relative to the tracks), in order to determine a location of the structure in a coordinate space used by the OML end effectors and the IML end effectors. In a further embodiment, the installing is performed by at least one pair of end effectors operating on a fore portion of the surround, and by at least one pair of end effectors operating on an aft portion of the surround, wherein the pairs operate simultaneously.

EXAMPLES

In the following examples, additional processes, systems, and methods are described in the context of a fastener installation system. Any or all of the methods 200, 700, 800, 900, and 1000 described herein can be embodied on a non-transitory computer-readable medium as programmed instructions.

Figure 11:
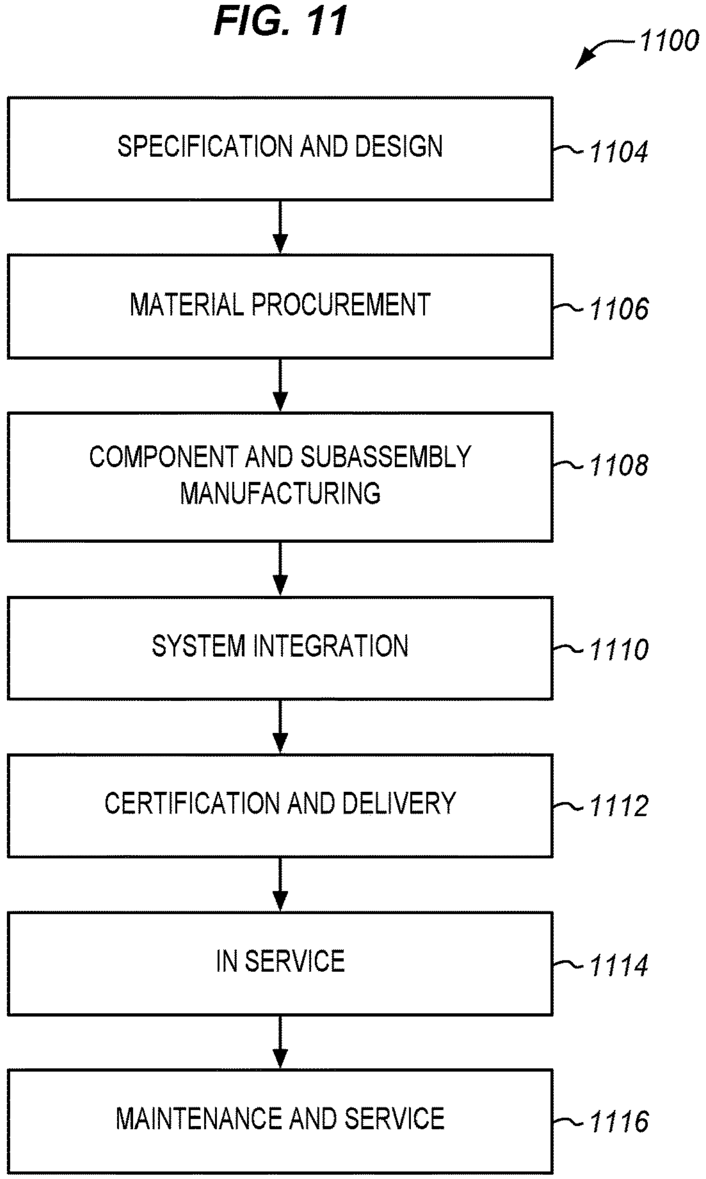
FIG. 11 is a flow diagram of aircraft production and service methodology in an illustrative embodiment in which the methods shown in FIGS. 1 and 7-10 can be employed.
Figure 12:
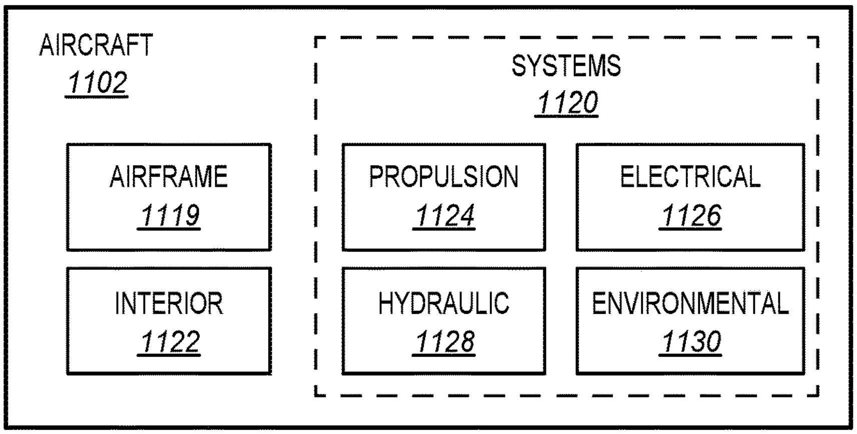
FIG. 12 is a block diagram of an aircraft in an illustrative embodiment that can be manufactured using the fastener installation systems shown in FIGS. 1 and 3-6 and/or the methods shown in FIGS. 1 and 7-10.

Referring more particularly to FIGS. 11 and 12, embodiments of the disclosure may be described in the context of aircraft manufacturing and service in method 1100 as shown in FIG. 11 and an aircraft 1102 as schematically shown in FIG. 12. During pre-production, method 1100 may include specification and design 1104 of the aircraft 1102 and material procurement 1106. During production, component and subassembly manufacturing 1108 and system integration 1110 of the aircraft 1102 takes place. The methods 200, 700, 800, 900, and 1000 (shown in FIGS. 2 and 7-10) may be performed during component and subassembly manufacturing 1108.

Thereafter, the aircraft 1102 may go through certification and delivery 1112 in order to be placed in service 1114. While in service by a customer, the aircraft 1102 is scheduled for routine work in maintenance and service 1116 (which may also include modification, reconfiguration, refurbishment, and so on). Systems and methods embodied herein may be employed during any one or more suitable stages of the production and service described in method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion system 1124, electrical system 1126, hydraulic system 1128, environmental system 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by method 1100 may include an airframe 1118 with a plurality of systems 1120 and an interior 1122. The airframe 1118 includes a fuselage 1119, and the fuselage 1119 includes the structure 110 as assembled using the fastener installation system 100 (shown in FIG. 1) and the method 200 (shown in FIG. 2). Examples of systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

FIG. 13 is a cross-sectional view of the aircraft 1102 shown schematically in FIG. 12. The aircraft 1102 includes the airframe 1118 having the fuselage 1119. The portion of the fuselage 1119 shown in FIG. 13 can be the fuselage portion 308 of the structure 110, 310 that was assembled using the fastener installation system 100, 300 and the methods 200, 700, 800, 900, 1000. The fuselage 1119, and fuselage portion 308, includes frames 1140. The frames 1140 have fasteners 102 driven there though. The fasteners 102 attach the frames 1140 to a skin 1142 of the fuselage 1119 (and fuselage portion 308). For example, holes 104 extend through the frame 1140 and skin 1142, and the fasteners 102 are inserted through the holes 104 to secure the frame 1140 to the skin 1142. The fuselage 1119 also includes stringers 1144. In the example shown in FIG. 13, the fuselage also includes surrounds 119.

As already mentioned above, fastener installation system 100, 300 and methods 200, 700, 800, 900, 1000 embodied herein may be employed during any one or more of the stages of the production and service described in method 1100. For example, components or subassemblies corresponding to component and subassembly manufacturing 1108 may be fabricated or manufactured in a manner similar to components or subassemblies produced while the aircraft 1102 is in service. Also, one or more system embodiments, method embodiments, or a combination thereof may be utilized during the subassembly manufacturing 1108 and system integration 1110, for example, by substantially expediting assembly of or reducing the cost of an aircraft 1102. Similarly, one or more of system embodiments, method embodiments, or a combination thereof may be utilized while the aircraft 1102 is in service, for example and without limitation during the maintenance and service 1116. For example, the techniques and systems described herein may be used for material procurement 1106, component and subassembly manufacturing 1108, system integration 1110, service 1114, and/or maintenance and service 1116, and/or may be used for airframe 1118 and/or interior 1122. These techniques and systems may even be utilized for systems 1120, including, for example, propulsion system 1124, electrical system 1126, hydraulic system 1128, and/or environmental system 1130.

In one embodiment, a part, such as the structure 110, 310 (shown in FIGS. 1 and 3), comprises a portion of airframe 1118, and is manufactured during component and subassembly manufacturing 1108 using, for example, the method 200 (shown in FIG. 2). The part may then be assembled into an aircraft in system integration 1110, and then be utilized in service 1114 until wear renders the part unusable. Then, in maintenance and service 1116, the part may be discarded and replaced with a newly manufactured part. Inventive components and methods may be utilized throughout component and subassembly manufacturing 1108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for applying fasteners to a structure, the method comprising:

disposing the structure on a plurality of rails;

disposing a first set of end effectors along a fixed inner track that follows an Inner Mold Line (IML) surface of the structure;

disposing a second set of end effectors along a fixed outer track that follows an Outer Mold Line (OML) surface of the structure, wherein the first set of end effectors and the second set of end effectors define a gap for the structure to pass through;

aligning a first end effector of the first set of end effectors along the fixed inner track together with a second end effector of the second set of end effectors along the fixed outer track;

clamping the structure between the first end effector and the second end effector by pressing the first end effector and the second end effector into the structure;

applying a fastener to the structure;

assigning the end effectors in the first set to different radial zones at the Inner Mold Line (IML) surface of the structure; and assigning the end effectors in the second set to the different radial zones at the Outer Mold Line (OML) surface of the structure, wherein the plurality of rails extend through the fixed outer track and move the structure in a longitudinal direction from a first end of each of the plurality of rails to a second end of each of the plurality of rails through the fixed outer track, and wherein the structure moves without obstruction from the first end of each of the plurality of rails to the second end of each of the plurality of rails through the gap between the first end effector and the second end effector.

2. The method of claim 1 wherein:

the first set of end effectors comprises at least 2 end effectors;

the second set of end effectors comprises at least 2 end effectors;

the disposing the first set of end effectors comprises disposing the first set of end effectors within a radius (R_INNER) smaller than a radius (R) of the structure; and the disposing the second set of end effectors comprises disposing the second set of end effectors within a radius (R_OUTER) larger than the radius (R) of the structure.

3. The method of claim 1 further comprising:

moving the first end effector and the second end effector to another fastener installation location along a curvature of the structure;

clamping the structure by pressing the first end effector and the second end effector into the structure; and applying another fastener to the structure.

4. The method of claim 1 wherein:

the applying the fastener comprises:

drilling a fastener hole comprising a countersink hole; and inserting a fastener into the fastener hole.

5. The method of claim 1 wherein:

the disposing the first set of end effectors and the disposing the second set of end effectors comprises:

moving the first set of end effectors and the second set of end effectors along a first circumferential direction to apply multiple fasteners; and moving the first set of end effectors and the second set of end effectors along a second circumferential direction that is opposed to the first circumferential direction to apply additional fasteners.

6. The method of claim 1 wherein:

the assigning end effectors in the first set and the assigning end effectors in the second set comprises assigning each end effector of the first set and each end effector of the second set to the different radial zones wherein at least two of the different radial zones partially overlap another of the radial zones.

7. The method of claim 1 wherein:

the applying the fastener to the structure comprises driving the fastener through a frame disposed at the IML surface of a fuselage portion and through the fuselage portion.

8. The method of claim 1 wherein:

the disposing the first set of the end effectors along the fixed inner track comprises disposing the first set along the fixed inner track that includes a first semicircle; and the disposing the second set of end effectors along the fixed outer track comprises disposing the second set along the fixed outer track that includes a second semicircle that is larger than the first semicircle and concentric with the first semicircle.

9. The method of claim 1 wherein:

the disposing the first set of end effectors along the fixed inner track comprises disposing the first set to follow the IML surface that is curved; and the disposing the second set of end effectors along the fixed outer track comprises disposing the second set to follow the OML surface that is curved.

10. The method of claim 1 wherein:

the assigning end effectors in the first set and the assigning end effectors in the second set comprises assigning each end effector of the first set and each end effector of the second set to the different radial zones wherein at least two of the different radial zones partially overlap another of the radial zones;

the disposing the first set of end effectors along the fixed inner track comprises disposing the first set to follow the IML surface that is curved; and the disposing the second set of end effectors along the fixed outer track comprises disposing the second set to follow the OML surface that is curved.

11. A method for applying fasteners to a structure, the method comprising:

disposing the structure on a plurality of rails;

disposing a first set of at least three end effectors along a fixed inner track that follows an Inner Mold Line (IML) surface of the structure;

disposing a second set of at least three end effectors along a fixed outer track that follows an Outer Mold Line (OML) surface of the structure, wherein the first set of end effectors and the second set of end effectors define a gap for the structure to pass through;

aligning a first end effector of the first set of at least three end effectors along the fixed inner track together with a second end effector of the second set of at least three end effectors along the fixed outer track;

clamping the structure between the first end effector and the second end effector by pressing the first end effector and the second end effector into the structure;

applying a fastener to the structure;

assigning the end effectors in the first set to different radial zones at the Inner Mold Line (IML) surface of the structure; and assigning the end effectors in the second set to the different radial zones at the Outer Mold Line (OML) surface of the structure, wherein the plurality of rails extend through the fixed outer track and move the structure in a longitudinal direction from a first end of each of the plurality of rails to a second end of each of the plurality of rails through the fixed outer track, and wherein the structure moves without obstruction from the first end of each of the plurality of rails to the second end of each of the plurality of rails through the gap between the first end effector and the second end effector.

12. The method of claim 11 wherein:

the disposing the first set the disposing the first set of at least three end effectors comprises disposing the first set of at least three end effectors within a radius (R_INNER) smaller than a radius (R) of the structure; and the disposing the second set of at least three end effectors comprises disposing the second set of at least three end effectors within a radius (R_OUTER) larger than the radius (R) of the structure.

13. The method of claim 11 further comprising:

moving the first end effector and the second end effector to another fastener installation location along a curvature of the structure;

clamping the structure by pressing the first end effector and the second end effector into the structure; and applying another fastener to the structure.

14. The method of claim 11 wherein:

the applying the fastener comprises:

drilling a fastener hole comprising a countersink hole; and inserting a fastener into the fastener hole.

15. The method of claim 11 wherein:
the disposing the first set of at least three end effectors and the disposing the second set of at least three end effectors comprises:
moving the first set of at least three end effectors and the second set of at least three end effectors along a first circumferential direction to apply multiple fasteners; and
moving the first set of at least three end effectors and the second set of at least three end effectors along a second circumferential direction that is opposed to the first circumferential direction to apply additional fasteners.

16. The method of claim 11 wherein:
the assigning end effectors in the first set and the assigning end effectors in the second set comprises assigning each end effector of the first set and each end effector of the second set to the different radial zones wherein at least two of the different radial zones partially overlap another of the radial zones.

17. The method of claim 11 wherein:
the applying the fastener to the structure comprises driving the fastener through a frame disposed at the IML surface of a fuselage portion and through the fuselage portion.

18. The method of claim 11 wherein:
the disposing the first set of at least three the end effectors along the fixed inner track comprises disposing the first set along the fixed inner track that includes a first semicircle; and
the disposing the second set of at least three end effectors along the fixed outer track comprises disposing the second set along the fixed outer track that includes a second semicircle that is larger than the first semicircle and concentric with the first semicircle.

19. The method of claim 11 wherein:
the disposing the first set of at least three end effectors along the fixed inner track comprises disposing the first set to follow the IML surface that is curved; and
the disposing the second set of at least three end effectors along the fixed outer track comprises disposing the second set to follow the OML surface that is curved.

20. The method of claim 11 wherein:
wherein: the assigning end effectors in the first set and the assigning end effectors comprises assigning each end effector of the first set and each end effector of the second set to the different radial zones wherein at least two of the different radial zones partially overlap another of the radial zones;
disposing the first set of at least three end effectors along the fixed inner track comprises disposing the first set to follow the IML surface that is curved; and
disposing the second set of at least three end effectors along the fixed outer track comprises disposing the second set to follow the OML surface that is curved.

21. A method for applying fasteners to a structure, the method comprising:
disposing the structure on a plurality of rails;
disposing a first set of at least two end effectors along a fixed inner track that follows an Inner Mold Line (IML) surface of the structure, wherein the first set of end effectors comprises at least 2 end effectors;
disposing a second set of at least two end effectors along a fixed outer track that follows an Outer Mold Line (OML) surface of the structure, wherein the second set of end effectors comprises at least 2 end effectors, wherein the first set of end effectors and the second set of end effectors define a gap for the structure to pass through;
aligning a first end effector of the first set of at least two end effectors along the fixed inner track together with a second end effector of the second set of at least two end effectors along the fixed outer track;
clamping the structure between the first end effector and the second end effector by pressing the first end effector and the second end effector into the structure;
applying a fastener to the structure;
assigning the end effectors in the first set to different radial zones at the Inner Mold Line (IML) surface of the structure; and
assigning the end effectors in the second set to the different radial zones at the Outer Mold Line (OML) surface of the structure,
wherein the plurality of rails extend through the fixed outer track and move the structure in a longitudinal direction from a first end of each of the plurality of rails to a second end of each of the plurality of rails through the fixed outer track, and
wherein the structure moves without obstruction from the first end of each of the plurality of rails to the second end of each of the plurality of rails through the gap between the first end effector and the second end effector.

* * * * *